UNITED STATES PATENT OFFICE.

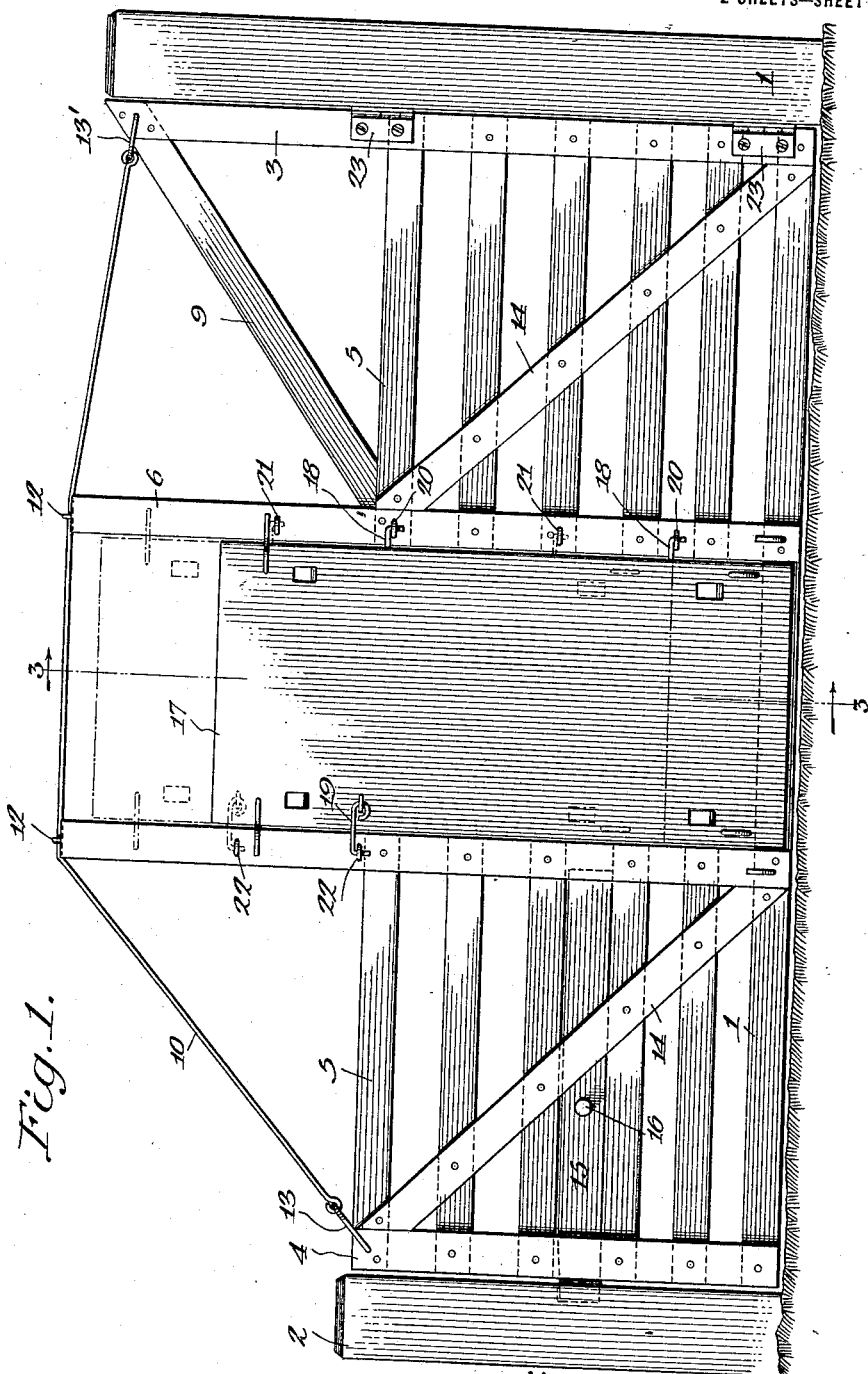

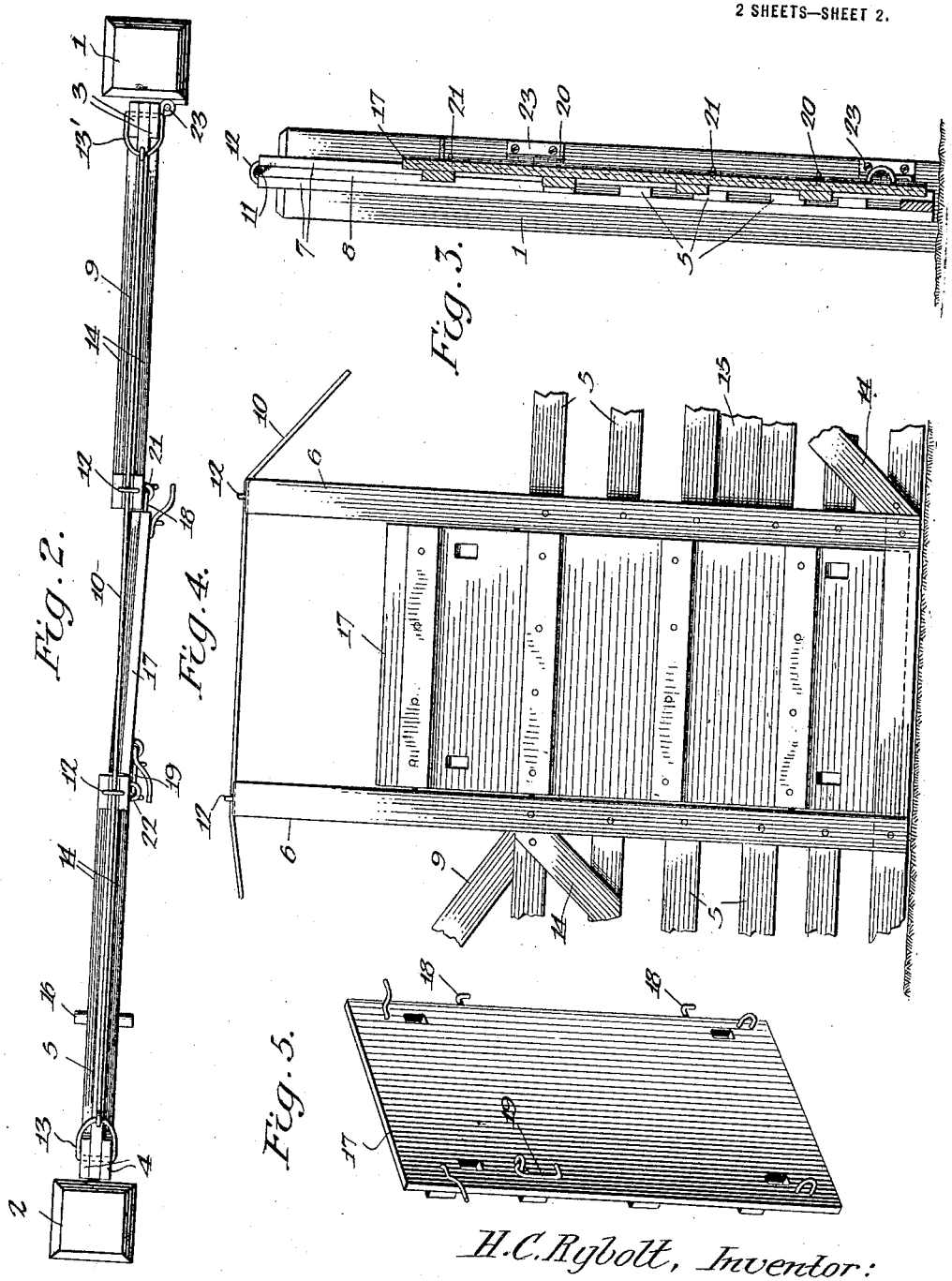

HENRY C. RYBOLT, OF KENNEY, ILLINOIS.

FARM-GATE.

1,219,668.  Specification of Letters Patent.  Patented Mar. 20, 1917.

Application filed May 11, 1916. Serial No. 96,911.

*To all whom it may concern:*

Be it known that I, HENRY C. RYBOLT, a citizen of the United States of America, residing at Kenney, in the county of Dewitt and State of Illinois, have invented certain new and useful Improvements in Farm-Gates, of which the following is a specification, reference being had therein to the accompanying drawing.

This invention relates to a farm gate and has for its principal object the production of an adjustable auxiliary gate at the central portion of the main gate so as to permit people or animals to pass through this auxiliary gate without necessitating the opening of the main gate.

Another object of this invention is the production of a farm gate which is so constructed as to be provided with a central auxiliary gate, which auxiliary gate is adjustably mounted with respect to its vertical position so that if so desired it may be carried in an elevated position thereby leaving a considerable space beneath its lower portion so as to permit the passage of smaller animals therebeneath.

A still further object of this invention is the production of a farm gate which is so constructed as to permit the bracing strand carried upon the upper portions of the central standards to efficiently reinforce these standards and also brace the gate.

With these and other objects in view this invention consists of certain novel combinations, constructions, and arrangements of parts as will be hereinafter fully described and claimed.

In the accompanying drawings:

Figure 1 is a front elevation of the farm gate as constructed in accordance with this invention.

Fig. 2 is a top plan view of the farm gate.

Fig. 3 is a central vertical section taken on the line 3—3 of Fig. 1, looking in the direction of the arrows.

Fig. 4 is a fragmentary elevation of a portion of the complete gate, showing the opposite side of the auxiliary gate as shown in Fig. 1.

Fig. 5 is a detail perspective view of the auxiliary gate.

Referring to the accompanying drawings by numerals it will be seen that this farm gate is adapted to be used in connection with the primary post 1 and the auxiliary post 2 carried in spaced relation. The main gate comprises the base bar 1 extending throughout its entire length, which base bar has the primary end standards 3 secured upon each side thereof at one end and the auxiliary end standards 4. The end standards 3 and 4 being carried in spaced relation with respect to each other have the ends of the longitudinally extending bars 5 interposed therebetween, as shown in Fig. 3. The central standards 6 are formed of a number of strips, as shown in Fig. 3, comprising the outer strips 7 and the central strip 8. These central standards 6 extend for a considerable distance above the horizontal bars 5 or for a distance substantially in the plane of the upper portion of the primary end standards 3. It will also be noted that this end standard 3 has the diagonal brace 9 extending from its upper end, which diagonal brace 9 extends outwardly to be connected to one of the bars 5 adjacent one of the standards 6. The bracing strand 10 extends across the upper ends of the central standards 6 and because of the fact that the central strip 8 of the standards 6 is grooved, as shown at 11 in Fig. 3 the central bracing strand 10 will be held against accidental displacement, although it may be further retained in position by means of the staples 12.

The link 13 is carried so as to extend through the upper ends of the auxiliary end standards 4 and to this link 13 one end of the bracing strand 10 is connected. The opposite end of this strand 10, however, is connected to the link 13' carried by the upper end of the primary end standards 3 and the diagonal brace 9. Since this bracing strand 10 extends across the upper ends of the central standards 6 and is very taut when in use it will be seen that these central standards will be efficiently braced and will be held in their correct spaced relation. Furthermore, the engagement of the links and the ends of the strand 10 with the upper ends of the end standards 3 and 4 will cause the gate to be held from sagging or losing its correct shape when in use. It will further be seen that diagonal braces 14 are carried upon the sides of the bars 5 for bracing the bars, while the sliding bar 15 extends between the auxiliary end standards 4 and the braces 14 thereof so as to be held in position. A pin 16 fits through this bar 15 so that this bar may be easily reciprocated so as to pass into the post 2 for holding the main gate in a closed position when desired. It is obvious that the movement of the bar 15 in either direction will be limited by the pin 16 engaging either the end standard 4 or the diagonal brace 14.

The auxiliary gate 17 is substantially rectangular and is elongated, as shown in Figs. 1, 4, and 5. This gate 17 has hooks 18 extending from one side edge thereof, while the latch 19 is pivotally connected adjacent the opposite side edge, as shown in Fig. 5. One of the central standards 6 is provided with staples 20 and 21 carried in spaced relation, as shown in Fig. 1. The opposite standard 6 also carries the eyes 22.

When this farm gate is in use it may be swung to the position shown in Fig. 1 so as to permit the bar 15 to engage the base 2. This action will cause the main gate to be held in a closed position since it is hingedly secured to the post 1 by means of the hinges 23. Under normal conditions the auxiliary central gate has the hooks 18 thereof carried by the staples 20. When carried in this position it will be seen that the central gate 17 is in a lowered plane, thus forming a closure between the central standards 6 for preventing the passage of animals through the gate when the same is in a closed position. At this time the latch 19 will be engaging one of the eyes 22, thereby holding this central auxiliary gate in a closed position. Of course, it is obvious that if it is desired to have an animal pass between these central standards 6 or if a person desires to pass therebetween it is only necessary to lift the latch 19 from engagement with this particular eye 22 and thus the central auxiliary gate 17 may be swung to an open position. It is obvious that when the auxiliary gate 17 is swung to a closed position it will strike upon the longitudinally extending base bar 1, whereby its movement will be limited. At this time the latch 19 may be restored to engagement with the eye which it has just been previously engaging. If it is desired to have the auxiliary gate 17 moved to such a position as to permit small animals such for instance as hogs to pass therebetween it may be lifted so as to position the hooks 18 in engagement with the staples 21 so that although the central gate 17 will be held in an elevated position it will also be hinged upon the main gate. In order to retain the central auxiliary gate 17 in a fixed position when it is elevated, as shown in dotted lines in Fig. 1 the latch 19 may be swung into engagement with the upper eye 22. It will be seen by referring to Fig. 1 that when this central auxiliary gate is carried in an elevated position as shown in dotted lines sufficient space is provided below the lower portions of this auxiliary gate so that small animals may pass therebeneath without necessitating the opening of the main gate or of the auxiliary gate. It will further be seen, however, that when the auxiliary gate is carried in an elevated position sufficient space for the passing of larger animals or cattle therethrough is not provided.

It will further be seen that a very simple and efficient bracing means has been provided for this gate which will positively hold the entire device rigid and in its correct position for use at all times. Therefore, it will be seen that by the construction of this farm gate a gate is provided which may be opened so as to permit the passage of animals therethrough or when so desired the central auxiliary gate may be opened for the passage of either people or cattle therethrough, this central auxiliary gate being carried in an adjusted position so that although when in a closed condition it may be carried at such a height as to permit the passage of small animals therethrough.

What is claimed is:

In a device of the class described, the combination of a main gate comprising a base beam, end standards extending vertically from each end of said base beam, the standards at one end of said beam being longer than the standards at the other end, central standards carried in spaced relation adjacent the central portions of said base beam, said central standards comprising outer strips and an interposed central strip, horizontally extending bars fitting between the end standards and the outer strips of said central standards, links carried by the upper ends of said end standards, a bracing strand connecting said links, the central strips of said central standards being provided with grooves in their upper ends, said bracing strand fitting within said grooves, whereby said main gate will be efficiently reinforced, and an auxiliary gate carried by said central standards.

In testimony whereof I hereunto affix my signature.

HENRY C. RYBOLT.